Patented July 24, 1923.

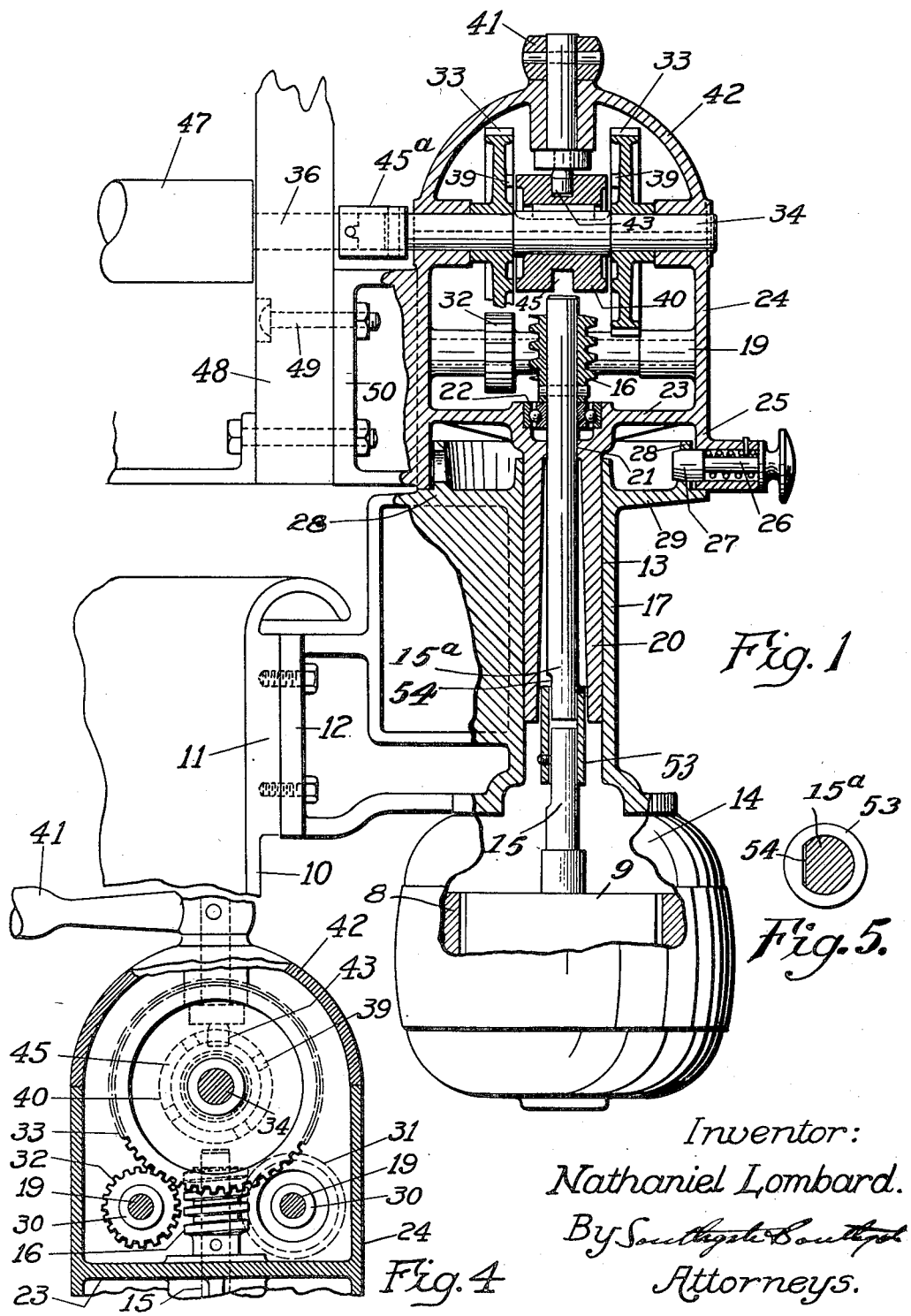

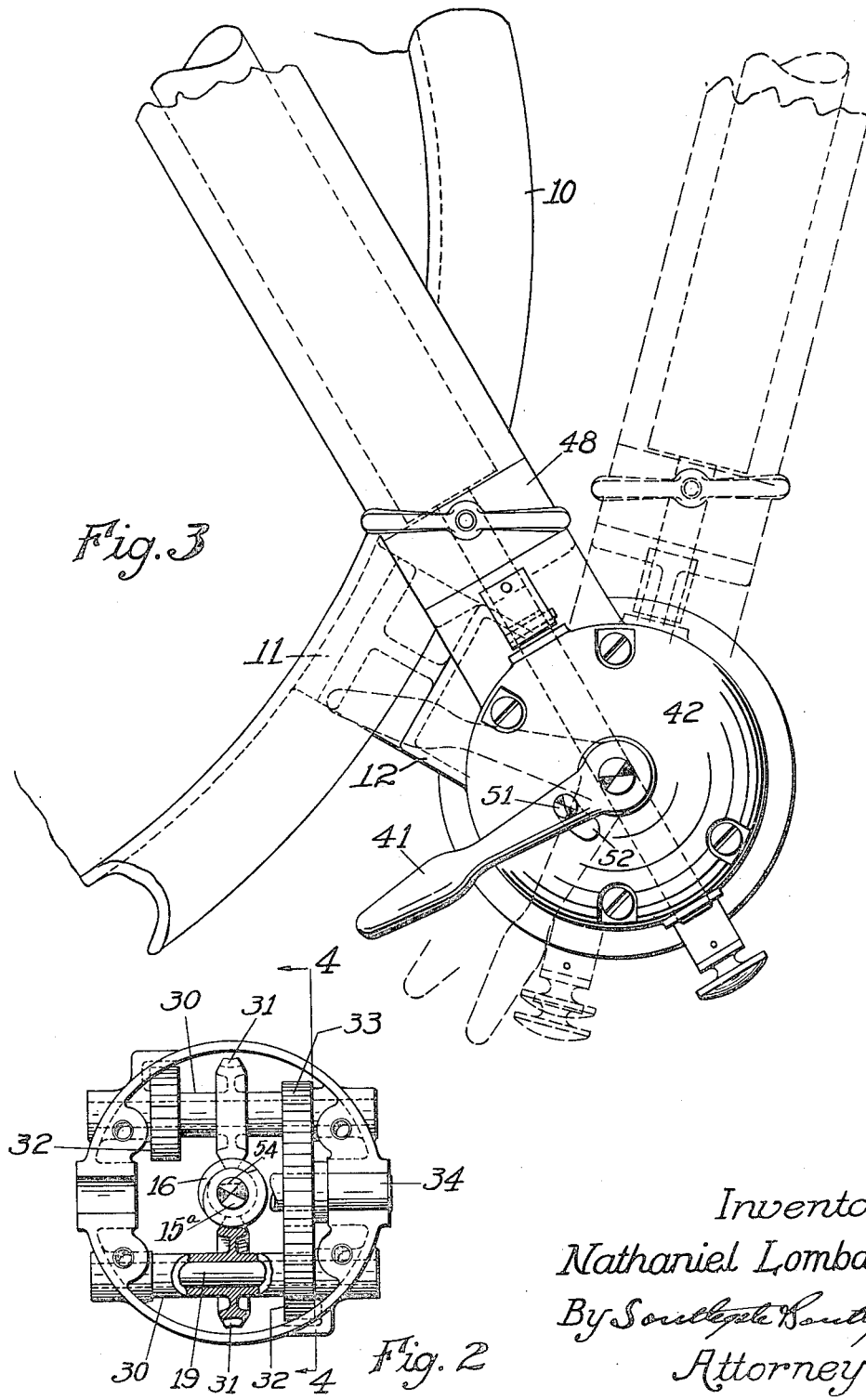

1,462,939

UNITED STATES PATENT OFFICE.

NATHANIEL LOMBARD, OF WORCESTER, MASSACHUSETTS, ASSIGNOR TO THE LOMBARD-WHITE COMPANY, OF WORCESTER, MASSACHUSETTS, A CORPORATION OF MASSACHUSETTS.

WRINGER AND MOTOR SUPPORT FOR WASHING MACHINES.

Application filed December 27, 1920. Serial No. 433,314.

*To all whom it may concern:*

Be it known that I, NATHANIEL LOMBARD, a citizen of the United States, residing at Worcester, in the county of Worcester and State of Massachusetts, have invented new and useful Wringer and Motor Supports for Washing Machines, of which the following is a specification.

This invention relates to a novel means for supporting a washing machine wringer and the motor for running it and connecting them to each other. Other objects of the invention are to support these elements in such a way as to provide conveniently for the turning of the wringer to two or more positions on an axis and to simplify the connections required to permit this and at the same time to permit the operation of the motor to run the wringer.

This invention relates particularly to that type of washing machine in which the wringer is run by a separate motor not used for any other purpose but is not limited thereto.

Reference is to be had to the accompanying drawings in which—

Fig. 1 is a side view largely in central section, of a wringer bracket and operating connections, showing a preferred form of this invention;

Fig. 2 is a plan of the operating mechanism, the cover of the casing being removed;

Fig. 3 is a plan of the device as a whole;

Fig. 4 is a vertical sectional view on the line 4—4 of Fig. 2; and Fig. 5 is a top view of the connecting means for the two parts of the motor shaft with the upper section of the shaft shown in section.

I have shown the invention as applied to a washing machine or tub 10 of circular shape but it can be applied to any kind of a washing machine. For this purpose I have shown the tub as provided with a lug 11 to which is screwed a bracket 12 having a flange for that purpose. This bracket is also provided with a cylindrical standard 17 having an internal vertical bearing 13. At the bottom of the same it supports a casing 14 in which the electric motor is located. This motor is turned on and off in any convenient manner, the details of which are not shown herein. It is provided with a motor shaft 15 extending up centrally through the center of the bearing 13 and provided with a worm 16 at the top or other means for transmitting power. The armature 9 of the motor is fixed on the shaft 15 and the magnets 8 in the stationary casing 14 on the bracket 12.

In the bearing 13 rests a hollow vertical sleeve 20. This extends down in this bearing as far as possible so as to have a long cylindrical bearing surface and it is provided with a bearing 21 for the shaft 15 which extends up through it. Just above this it is provided with a rigid type of ball bearing 22 which supports the worm 16 and consequently the shaft 15.

Extending outwardly from these bearings is a web 23 constituting the bottom of a casing 24. This casing has a cylindrical flange 25 extending downwardly from it in which is located a spring pin 26 having a plunger 27 adapted to enter one or more perforations in a flange 28. This is concentric with the flange 25 and extends upwardly from a web 29 forming a surrounding projection on the top of the cylindrical standard 17. This flange 28 receives the plunger 27 in either of its perforations and locates it in any desired position around the center of the vertical shaft. The casing 24 can be packed with grease at the bottom and also the cup 28 and there will be no loss by leakage.

This casing 24 is provided with a pair of hollow transverse shafts 30 each rotating on a fixed stud 19. Integral with each of these shafts is a worm wheel 31 meshing with the worm 16 which is between them. The rotation of this worm, therefore, in a constant direction rotates the shafts 30 in opposite directions and at a slow speed. On each of these shafts there is a pinion 32 meshing with a gear 33 on a shaft 34 parallel with these two shafts and located above the shaft 15. The two spur gears 33 both freely rotate on it. They are driven in opposite directions by the two shafts 30. The pinions 32 are shown as of the same diameter, also the gears 33.

The two gears 33 have clutch teeth 39 on their inner faces. Slidably keyed on the shaft 34 there is a clutch section 40 which is operated by a clutch handle 41 located on the cap 42 which constitutes the top of the casing. This handle is provided with an eccentric pin 43 engaging in a depression 45 in the clutch section 40. By turning this handle the clutch section can be moved in either direction to engage the shaft 34 with either of the gears 33. This results in rotating the shaft 34 in either direction as desired. This shaft is connected by a coupling 45ª with the shaft 36 of one of the wringer rolls 47 which is mounted in the wringer frame 48. This frame is secured by bolts as 49 to an offset 50 on the casing 24 at one side. The handle 41 has a pin 51 entering a slot 52 in the top 42 of the casing and limiting the motion of the handle on its axis.

The motor shaft is in two parts in alignment. On one of them 15 is pinned a sleeve 53 having a non-circular socket projecting beyond that part of the shaft and shown as having one side flat. The end of the other part 15ª of the shaft is slabbed off at 54 to the same shape. On account of this the wringer with casing 24 and upper half of shaft 15 can be lifted off as a whole for shipment or other purpose.

In operation, the handle 41 can be turned to any one of the three positions shown at the bottom of Fig. 3. This will rotate the wringer rolls either forward or backward or prevent their rotating at all if in central or neutral position. The positions just described are the ones in which the handle is located when the spring pin 26 is so located as to hold the wringer frame over the edge of the tub as shown in full lines in Fig. 3. If it is desired to turn the wringer outwardly away from the tub, as shown in dotted lines, this is done by pulling out the pin 26 against the action of its spring and swinging the casing 24 around with the wringer until the plunger 27 springs into the other perforation through the flange 28. This will leave the wringer in the dotted line position of Fig. 3. The handle 41 moves with it as indicated in the upper dotted line position.

From this it will be seen that the wringer can be swung to either of its ordinary positions and held conveniently in either one without giving any thought to the condition of the motor and, in fact, without stopping it if it happens to be running. Furthermore, the wringer can be turned on and off in a very simple manner. It will be seen that by this gearing the speed of the motor is cut down to a very low rate with comparatively little gearing. It is important also that the wringer is turned, with its operating gearing, on the axis of the motor shaft as a center, thus simplifying the construction very materially over those arrangements in which the parts are turned on some different axis and special provisions have to be made to permit thereof. In this way when the wringer is turned there is practically no resistance to its motion unless it be the torque of the motor. There is no chance of the operator turning the frame at the wrong time thus injuring any of the parts and no danger of putting the parts into such position that the motor will run away. The gearing will not require frequent lubrication. Altogether it constitutes a simple and inexpensive drive for the wringer and permits all necessary motions of the wringer frame.

In the ordinary wringer the rolls cannot be rotated unless the wringer is located in position because otherwise the whole wringer would turn. I can operate the rolls by power when unlocked, and with full resistance.

Although I have illustrated and described only a single form of the invention and shown it as applied to a particular type of washing machine I am aware of the fact that modifications can be made therein by any person skilled in the art without departing from the scope of the invention as expressed in the claims. Therefore, I do not wish to be limited to all the details of construction shown and described, but what I do claim is:

1. In a device of the character described, the combination of a bracket adapted to be applied to a washing machine or the like, having a vertical bearing, a casing located above the bearing and having a downwardly projecting sleeve of circular cross-section with a long bearing surface, a vertical shaft extending up through the center of said sleeve and into the casing, said shaft being in two parts separable by raising the upper one, the lower part of said shaft having a motor armature mounted on and fixed to it, said bracket having the motor magnets fixed in position thereon and depending therefrom, and means in the casing operated by said shaft for transmitting power.

2. In a device of the character described, the combination of a bracket having a vertical bearing, a motor carried at the bottom of the bracket, a casing above the bracket having a downwardly extending cylindrical sleeve fitting in said bearing, a motor shaft extending upwardly through said sleeve and having a worm on its upper end, a bearing at the bottom of said casing on which said worm rests to support the motor shaft, said bracket having a circular projection around it at the top with an upwardly extending flange for receiving and holding grease, gearing in said casing meshing with said worm, and a clutch therein adapted to transmit power from the worm in either direction.

In testimony whereof I have hereunto affixed my signature.

NATHANIEL LOMBARD.